(No Model.)
S. R. SCREVEN.
DENTAL ENGINE.
No. 257,393. Patented May 2, 1882.
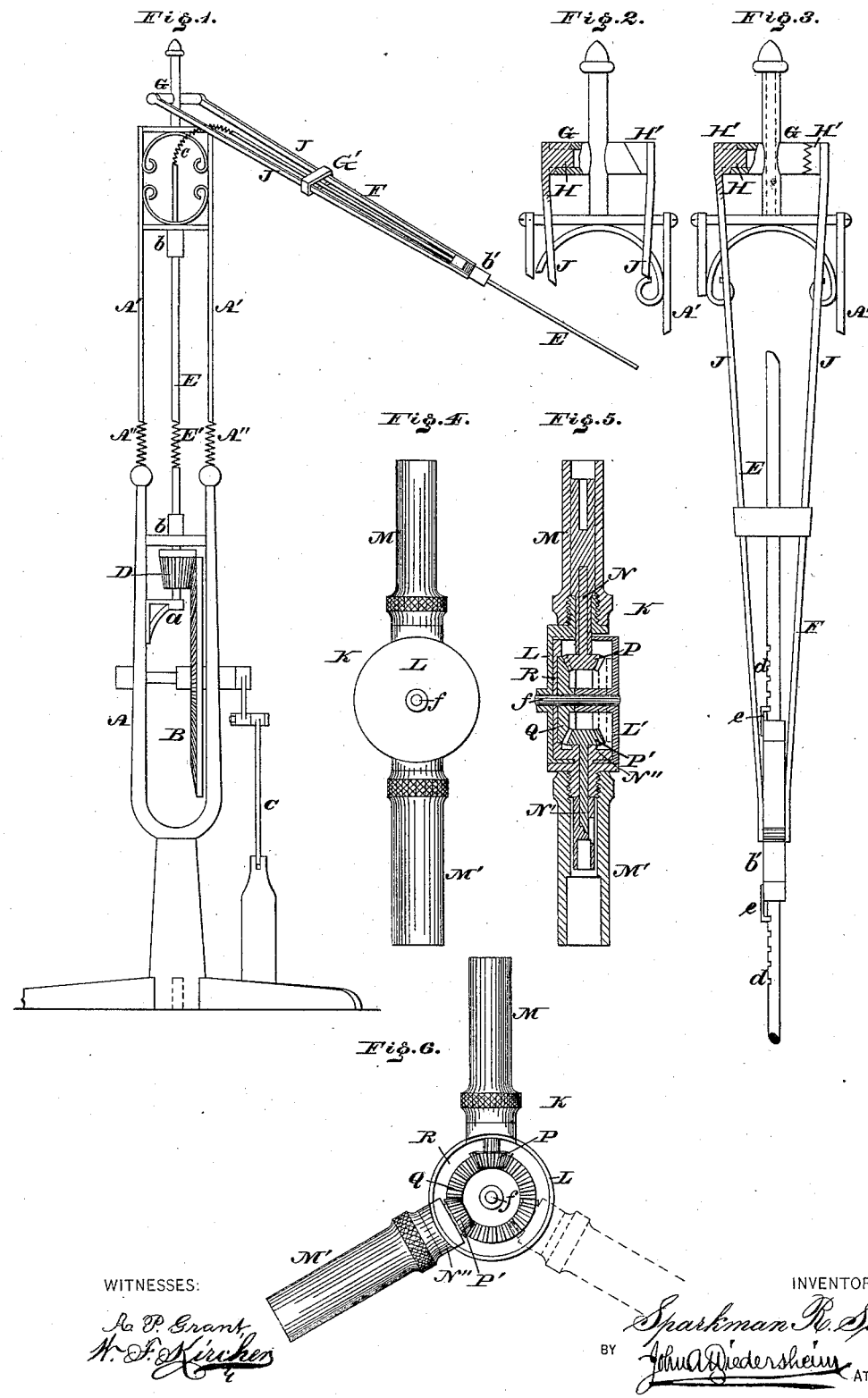
WITNESSES:
A. P. Grant
W. F. Kircher
INVENTOR:
Sparkman R. Screven,
BY John A. Wiedersheim ATTORNEY.

UNITED STATES PATENT OFFICE.

SPARKMAN R. SCREVEN, OF PHILADELPHIA, PENNSYLVANIA.

DENTAL ENGINE.

SPECIFICATION forming part of Letters Patent No. 257,393, dated May 2, 1882.

Application filed February 27, 1882. (No model.)

*To all whom it may concern:*

Be it known that I, SPARKMAN R. SCREVEN, a citizen of the United States, residing in the city and county of Philadelphia, State of Pennsylvania, have invented a new and useful Improvement in Dental Engines, which improvement is fully set forth in the following specification and accompanying drawings, in which—

Figure 1 is a side elevation, partly perspective, of the dental engine embodying my invention. Fig. 2 is an enlarged view of a detached portion thereof, partly sectional. Fig. 3 is an enlarged view of a detached portion thereof, partly sectional, Fig. 2 being a part of Fig. 3. Fig. 4 is a side elevation of the hand-piece enlarged. Fig. 5 is a longitudinal section thereof. Fig. 6 is a view of the hand-piece, the covering-cap being removed.

Similar letters of reference indicate corresponding parts in the several figures.

My invention consists of a flexible joint in the length of the stand of a dental engine and of the main shaft, whereby said stand and shaft may be tilted or bent over for increasing the range of the shaft of the engine.

It also consists of a movable arm for supporting the shaft, said arm being adapted to be readily sustained in various positions in an easy and reliable manner, the same being journaled to a stationary part of the stand and held thereagainst by the spring of the arm.

It also consists of means for adjusting the balance of the supporting-arm of the shaft.

It further consists of the peculiar construction of a coupling-piece for the driving-shaft and the hand-piece, whereby the hand-piece may be manipulated with great freedom, the motion of the piece being universal, as will be hereinafter set forth.

Referring to the drawings, A represents a stand on which is mounted the bevel-wheel B, and C represents a treadle of form and construction for operating said wheel.

D represents a bevel-pinion which meshes with the wheel B, and has its bearing-shaft mounted on a step, $a$, which is formed with or secured to the stand A.

Connected to the pinion D is a flexible shaft, E, which is guided on cross-pieces or bosses $b$ on the stand A, and sustained by a movable arm, F, and has the end opposite to the pinion D connected to the hand-piece, whereby by the rotation of the shaft E the power is communicated to the hand-piece, and consequently to the burr or tool attached thereto.

The upper portion, A', of the stand is connected to the rigid lower portion thereof by the coiled springs A'', which are sufficiently strong to retain said portion A' in an upright position; but when it is required to advance the hand-piece beyond the length of the shaft E the shaft is drawn forward, so as to overcome the power of the springs A, whereby the upper portion of the stand yields and is caused to bend or tilt in the direction of the draft on the shaft, and there is a longer range imparted to said shaft. When the draft on the shaft is relieved the bent or yielding portion of the stand, under the action of the springs A'', assumes its upright position, it being noticed that the springs are continuations and integral portions of the frame of the stand.

The portion of the shaft E which is mounted on the stand is formed of a rod or tube, which is supported and guided by the bosses $b$, hereinbefore referred to, and the portion of said shaft which is connected to the arm F is attached to the other named portion by a flexible connection or coiled spring, $e$, at or about the top of the stand, whereby the shaft is permitted great freedom of motion during the manipulation of the hand-piece.

The portion of the shaft at places coincident with the springs A'' of the stand is formed of a coiled spring, E', as a continuation of said portion, whereby when the stand is swung down or bent, as has been stated, the shaft properly yields with the stand, so that there is no binding of the parts.

On the top of the stand is mounted a horizontal piece, G, to which the arm F is pivoted, said piece being loosely fitted on a pin rising from the stand, and formed tubular, or having sockets in its ends to receive lugs H, which are formed on the ends of spring rods or bars J, constituting part of the frame of said arm F, said rods holding the lugs in the openings in the piece G. In order to increase the friction of the arm and piece G, the ends of the rods J are formed with collars H', which surround the lugs H, and have serrated edges, which engage with the serrated edges of the piece G, as in Fig. 3; or the contiguous edges of the collars and piece may be diagonal or spiral, as in Fig. 2, the object in either case being to form a friction-joint between said edges, the spring-rods J holding the edges in contact. When the arm is to be raised or lowered power is applied to the same to overcome the friction of the joint, whereby when the arm is at the proper height the power of the spring-rods is again exerted and the friction-joint is operative, whereby the arm remains in the position it is placed.

The tension of the spring rods or bars and the separating motion thereof are limited by a slide or clasp, G', which embraces said rods and is movable thereon. As the rods are spread at the upper or inner end, it is evident that the slide may be adjusted to exert more or less pressure on said rods. The movement of the arm is accomplished with ease, owing to the leverage afforded by it, as the friction-joint is at one end and the power to move the arm is exerted at the other end.

The spring-rods J of the arm F are pivoted or hinged to a boss, b', which guides the shaft E, and the portion of the shaft which passes through said boss and is on opposite sides thereof is notched or serrated, as at d, so as to be engaged by a pin, screw, spring, or other fastenings, as at e, applied to the boss b', whereby the shaft may be moved in or drawn out of said boss for adjusting the balance of the arm F, after which the fastenings e are applied and the parts retain their adjusted positions.

The coupling-piece K, with which the shaft E is connected and to which the hand-piece is attached, consists of a box, L, which is secured to the sleeve M, which incloses the spindle N, to which the shaft E is connected, said spindle passing through one end of the box L and projecting into the box, where it carries a bevel-pinion, P, which meshes with a bevel-wheel, Q, which is mounted within the box L.

N' represents a spindle, which is mounted on a lug, N'', which projects from a rotatable disk or plate, R, fitted within the box L back of the bevel-wheel Q, said spindle N' being inclosed by the sleeve M', having connected to it at one end the burr or tool and at the other end the bevel-pinion P', which meshes with the wheel Q.

L' represents the closing-cap of the box, which is secured to the shaft or axis f of the box L and incloses the gearing P P' Q.

It will be seen that when the shaft E is rotated power is communicated to the burr by means of the spindle N, gearing P P' Q, and spindle N'. As the disk or plate R is rotatable in the box L, the sleeve M', with the connected hand-piece, may be moved with said disk or plate, and thus manipulated relatively to the requirements of the dental operation. In the movement or change of angle of the sleeve M' the rotating bevel-pinion P' rolls on the bevel-wheel Q without stopping the motion of the gearing, and consequently of the burr. The same result is occasioned if the sleeve M is moved or moves. In this case the box L rotates with said sleeve and the pinion P rolls on the wheel Q without stopping or causing binding of the gearing or otherwise affecting the same. Furthermore, the entire hand-piece may be turned on the spindles N N' without stopping the engine, so that said piece may be grasped and manipulated on either side, and as the motions of the coupling-piece are universal the hand-piece may be operated with great freedom in every direction, and thus be conveniently presented to the various teeth upon which operations are to be performed.

Having thus described my invention, what I claim as new, and desire to secure by Letters Patent, is—

1. In a dental engine, the springs A'' E', in combination with the upper and lower parts of the stand and main shaft, and constituting integral portions thereof, respectively, substantially as and for the purpose set forth.

2. The rising and falling arm journaled to a stationary bearing-piece at the top of the stand, the edge of the journal of the arm being pressed against the edge of the bearing-piece by the spring of the arm, substantially as and for the purpose set forth.

3. The arm formed of spring rods or bars with collars H' and the tubular or socket piece G, combined and operating substantially as and for the purpose set forth.

4. The piece G and the spring rods or bars J, in combination with the slide G', substantially as and for the purpose set forth.

5. The shaft, in combination with the arm F, the boss b', and fastening e, substantially as and for the purpose set forth.

6. The coupling of a dental hand-piece and driving-shaft, consisting of the box L, the connected spindle N, the bevel-pinion P, the bevel-wheel Q, the spindle N', the bevel-pinion P', and the connected rotatable disk or plate R, combined and operating substantially as and for the purpose set forth.

S. R. SCREVEN.

Witnesses:
JOHN A. WIEDERSHEIM,
A. P. GRANT.